United States Patent [19]

Tupman

[11] Patent Number: 4,574,548
[45] Date of Patent: Mar. 11, 1986

[54] COLUMN REGLET

[75] Inventor: Thomas G. Tupman, Newport Beach, Calif.

[73] Assignee: Fry Reglet Corporation, Alhambra, Calif.

[21] Appl. No.: 580,380

[22] Filed: Feb. 15, 1984

[51] Int. Cl.$^4$ .................... E04B 1/00; E04F 13/06
[52] U.S. Cl. .................... 52/255; 52/262; 52/283; 52/371; 52/716
[58] Field of Search .......... 52/220, 221, 371, 283, 52/288, 255, 219, 58, 716; 285/42, 192

[56] References Cited

U.S. PATENT DOCUMENTS

| | | | |
|---|---|---|---|
| 1,399,748 | 12/1921 | Cheney | 285/42 X |
| 2,389,171 | 11/1945 | Urbain | 52/283 |
| 2,711,127 | 6/1955 | O'Day | 52/371 X |
| 3,159,251 | 11/1964 | Becker | 52/283 |
| 3,486,283 | 12/1969 | Arnett | 52/255 |
| 3,606,714 | 9/1971 | Arnett | 52/255 |
| 4,211,423 | 7/1980 | Resech | 285/42 X |
| 4,237,667 | 12/1980 | Pallucci et al. | 285/192 X |

FOREIGN PATENT DOCUMENTS

| | | | |
|---|---|---|---|
| 1287555 | 2/1962 | France | 52/58 |
| 120312 | 9/1981 | Japan | 52/221 |

Primary Examiner—Alfred C. Perham
Attorney, Agent, or Firm—Fred Flam

[57] ABSTRACT

A two part molding structure provides a quirk or reveal about a cylindrical column, one part being a spacer ring of flexible material, and the other part being an extruded metal grounding member of simple cross sectional configuration whereby it can be preformed or bent in situ to surround the spacer ring and form therewith the channel or reveal. The grounding member either provides a channel upon which ceiling tile can rest, or an edge against which moldable material, such as plaster, can be applied.

8 Claims, 4 Drawing Figures

U.S. Patent  Mar. 11, 1986  4,574,548
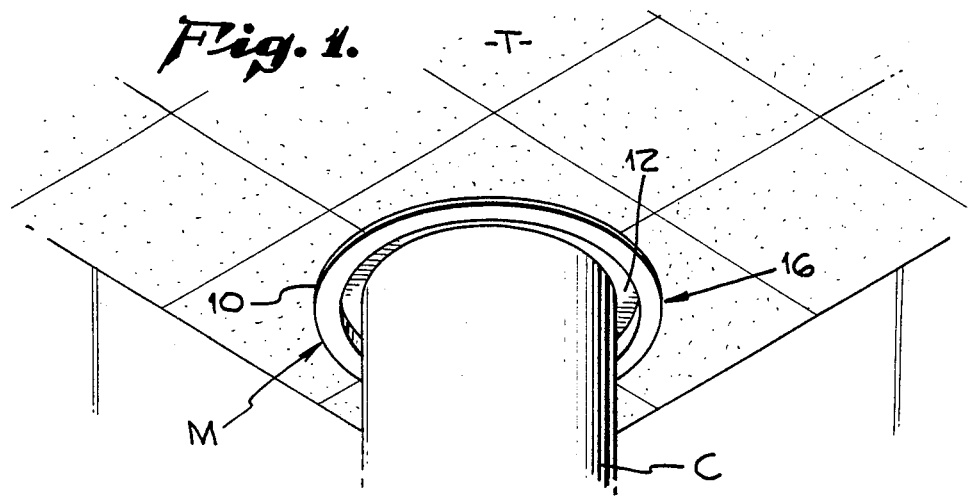
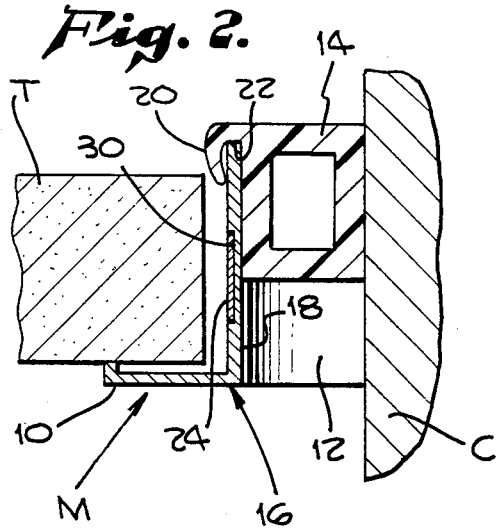
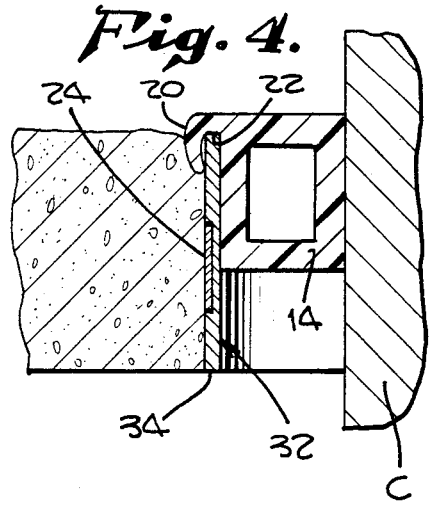
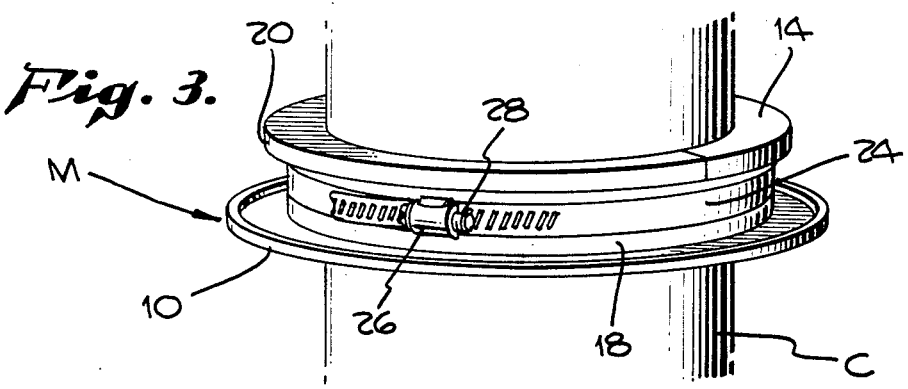

COLUMN REGLET

FIELD OF INVENTION

This invention relates to moldings for providing a neat junction between two architectural elements, and more particularly to a reveal moldings for use between cylindrical columns and ceiling plaster or tile.

BACKGROUND

Various metal molding strips that provide a reveal are shown and described, for example, in U.S. Pat. Nos. 3,606,714 and 3,486,283 to Robert W. Arnett, respectively entitled MOLDING STRIP FOR USE AS QUIRK OR REVEAL and SOFFIT MOLDING. Some of the shapes can be rolled into a curved configuration to conform to building structures having relative large radii of curvature. For example, the "F" molding shown in the U.S. Pat. No. 3,606,714 can successfully be rolled to curve about an axis parallel the the stem of the "F" providing the radius of curvature is fairly large. The bars of the "F" are short enough to accommodate some elongation.

To provide a downwardly opening reveal about a cylindrical column for cooperation with ceiling tile, a wide "W" section molding seems appropriate, one of the flanges of the "W" section lying against the column and attached thereto and the other of the flanges radiating outwardly from the column for supporting ceiling tile, the intermediate offset of the "W" providing the required reveal. Roll forming a section such as this with a small radius of curvature has not been successfully achieved. Even a simpler "Z" shaped section to provide a plaster ground cannot economically be curved to fit a column.

For lack of an adequate molding, there exist otherwise well designed buildings with crudely hand cut tiles fitted about a cylindrical column or with plaster badly joined thereto. It has been proposed to cut V-shaped notches in the sections of the metal preparatory to bending. This, however, is tedious, expensive, and at best a compromise. There has accordingly been a demand by architects and builders for an economical molding for use about cylindrical columns for neat juncture of ceiling tile or plaster.

SUMMARY OF INVENTION

The primary object of the present invention is to provide a simple and inexpensive reveal molding for use about a column of small radius of curvature. In order to achieve this objective, I provide a composite or two part molding. One part comprises a plastic spacer easily wrapped about the column; the other part comprises an extruded strip of simple configuration easily flexed or roll formed to assume the high degree of curvature corresponding to that of the column. The parts interfit. Together they are secured to the column by a band clamp. The requisite configuration for reveal is provided.

BRIEF DESCRIPTION OF THE DRAWINGS

A detailed description of the invention will be made with reference to the accompanying drawings wherein like numerals designate corresponding parts in the several figures. These drawings are to scale.

FIG. 1 is a perspective view from below of an architecturally completed column and ceiling utilizing a molding incorporating the present invention.

FIG. 2 is an enlarged transverse sectional view of the molding taking along a plane corresponding to the line 2—2 of FIG. 1.

FIG. 3 is a perspective view of the molding structure in the process of being clamped to the column prior to installation of ceiling tile.

FIG. 4 is a sectional view similar to FIG. 2, showing another form of the present invention.

DETAILED DESCRIPTION OF THE PREFERRED EMBODIMENT

The following detailed description is of the best presently contemplated mode of carrying out the invention. This description is not to be taken in a limiting sense, but is made merely for purposes of illustrating the general principles of the invention, the scope of the invention being defined by the appended claims.

Structural and operational characteristics attributed to forms of the invention first described shall also be attributed to forms later described, unless such characteristics are obviously inapplicable or unless specific exceptions are made.

In FIG. 1 there is illustrated a cylindrical column C that may be structural or decorative and that may be made of any material, such as concrete, steel or laminated wood. The column C projects upwardly beyond a ceiling structure. In the present example, the ceiling structure comprises acoustic tile T. The juncture between the tile T and the column C is neatly defined by a molding M that includes a flange 10 extending radially outwardly of a downwardly opening channel 12.

The crudely cut edges of the tile T are concealed by the flange 10 whereby a neat juncture can expeditiously be provided by ceiling tile workers. The bottom or upper end of the channel 12 is part of the molding M itself. This channel closely encircles the column C.

The molding, as more clearly shown in FIG. 2 comprises two main parts, a spacer ring 14 and a grounding member 16. The spacer ring 14 encircles the column C and partially defines the channel or reveal 12. The grounding member 16 is a strip of "L" shaped cross-sectional configuration, with its base or stem 18 surrounding and engaging the outer surface of the spacer ring 14. The stem 18 of the grounding member 16 projects below the spacer ring to define the outer wall of the channel or reveal 12. From the lower end of the stem 18, the flange 10 projects radially outwardly to form a ledge upon which the edges of the tiles T rest.

The grounding member is made of resilient extruded aluminum or other suitable material. Its simple "L" configuration allows it easily to be roll formed to conform to the radius of the column C plus the thickness of the spacer ring 14. The spacer ring 14 is made as an extrusion of flexible plastic material such as a suitable vinyl composition. Preferably, the ring has a hollow core to add flexibility and to conserve material. It readily bends to conform to the column C. The spacer ring 14 and the grounding member 16 interfit to determine a desired assembled relationship. For this purpose, the spacer ring 14 has a lip 20 that forms a shallow groove 22 for reception of the upper edge of the grounding member 16.

Prior to installation, the ends of the ring 14 and the ends of the grounding member 16 are not joined together, but are left free. At the site of installation, the two parts are, or have been, interfitted. The adjacent ends are axially separated to cause them to assume the configuration of a one turn helix, thus to provide an access opening whereby the parts can be slipped over the column C. Thereafter, the ends are repositioned and the normal circular configuration reassumed.

After the assembled spacer ring 14 and grounding member 16 are positioned at the proper ceiling height, they are clamped together and to the column C by a clamping band 24 as shown in FIG. 3. The band 24 has fittings of known construction for mounting draw screw members 26 and 28. The band 24 is accurately positioned by being seated in a shallow channel 30 formed in the stem 18 of the grounding member 16.

The two part construction is exceedingly simple, and easily installed to provide a neat finished appearance between the ceiling tile and the column.

DESCRIPTION OF SECOND EMBODIMENT

In the form of the invention shown in FIG. 4, a grounding member 32 is provided that is similar to the grounding member 16 of the previous form. In the present example, however, the grounding member simply provides an edge 34 instead of a flange. To this edge, plaster or moldable material is applied, the edge serving as a ready means for trimming the splashings to provide a neat well defined terminus for the ceiling material.

In the present example, the grounding member 32, being of straight section, is easily flexed at the building site to conform to the column curvature. Installation is easily accomplished by assembling the spacer ring 14 and the grounding member 32 while in their straight configuration, and then flexing both into position for cooperation with the clamping band.

Intending to claim all novel, useful and unobvious features and combinations of features shown or described, I claim:

1. In a building structure having a vertically extending, substantially cylindrical column, the combination therewith of:
    a. a spacer ring made of flexible material adapted to surround said cylindrical column;
    b. a gounding member surrounding the spacer ring, and made of material bendable to a curved configuration to conform to the radius of the cylindrical column and said spacer ring, said grounding member having a simple cross-sectional configuration to facilitate bending thereof;
    c. clamp means for holding the grounding member and the spacer ring to the cylindrical column;
    d. said grounding member having a distal part projecting axially beyond said spacer ring and along said column to form therewith an annular channel or reveal;
    e. said grounding member having a flange projecting radially outwardly in a substantially horizontal plane to provide a support over which finish tile and the like material may be placed with said flange concealing, from below, the edges of said tile and the like material; and
    f. finish material placed over said flange support.

2. The combination as set forth in claim 1 in which said grounding ring is performed to a curved configuration.

3. The combination as set forth claim 1 in which said spacer ring has a lip providing a pocket interfitting the proximal end of said grounding member to hold the spacer ring and said grounding member in assembled relationship and to determine a relative axial position therebetween.

4. In a building structure having a vertically extending, substantially cylindrical column, the combination therewith of:
    a. a spacer ring made of flexible material surrounding said column;
    b. a grounding member surrounding the spacer ring, and made of resilient material bendable to a curved configuration to conform to the radius of the column and said spacer ring, said grounding member having a simple cross sectional configuration to facilitate bending thereof;
    c. a clamping band holding the grounding member and the spacer ring to the column;
    d. said grounding member having a distal part projecting axially beyond said spacer ring to form therewith an annular channel or reveal, said grounding member having a radial flange projecting from said distal part; and
    e. ceiling tile cut to rest on said flange.

5. In a building structure having a vertically extending, substantially cylindrical column, the combination therewith of:
    a. a spacer ring made of flexible material surrounding said column;
    b. a grounding member surrounding the spacer ring, and made of resilient material bendable to a curved configuration to conform to the radius of the column and said spacer ring, said grounding member having a simple cross sectional configuration to facilitate bending thereof;
    c. a clamping band holding the grounding member and the spacer ring to the column;
    d. said grounding member having a distal part projecting axially beyond said spacer ring to form therewith an annular channel or reveal, said distal part terminating in an edge; and
    e. moldable finish material surrounding said grounding member with the said moldable finish material flush with and abutting said edge.

6. In a building structure having a vertically extending, substantially cylindrical column, the combination therewith of:
    a. a spacer ring made of flexible material adapted to surround said cylindrical column;
    b. a grounding member surrounding the spacer ring, and made of material bendable to a curved configuration to conform to the radius of the cylindrical column and said spacer ring, said grounding member having a configuration substantially as a nominally flat strip to facilitate its being flexed at a building site to conform to the curved configuration of said cylindrical column;
    c. clamp means for holding the grounding member and the spacer ring to the cylindrical column;
    d. said grounding member having a distal part projecting axially beyond said spacer ring and along said column to form therewith an annular channel or reveal;
    e. said distal part terminating in an edge to which moldable finish material can be applied with the edge serving to trim excess finish material; and
    f. finish material applied to the edge of said distal part.

7. The combination as set forth in claim 6 in which said spacer ring has a lip providing a pocket interfitting the proximal end of said grounding member to hold said grounding member and said spacer ring in assembled relationship and to determine a relative axial position therebetween.

8. In a building structure having a vertically extending, substantially cylindrical column, the combination therewith of:
   a. a spacer ring made of flexible material adapted to surround said cylindrical column;
   b. a grounding member surrounding the spacer ring, and made of material bendable to a curved configuration to conform to the radius of the cylindrical column and said spacer ring, said grounding member having a simple cross-sectional configuration to facilitate bending thereof;
   c. clamp means for holding the grounding member and the spacer ring to the cylindrical column;
   d. said grounding member having a distal part projecting axially beyond said spacer ring and along said column to form therewith an annular channel or reveal;
   e. said grounding member having a flange projecting radially outwardly in a substantially horizontal plane to provide a support over which finish tile and like material may be placed with said flange concealing, from below, the edges of said tile and like material; and
   f. finish material placed over said flange support.

* * * * *